US012087264B2

(12) United States Patent
Uetabira

(10) Patent No.: US 12,087,264 B2
(45) Date of Patent: Sep. 10, 2024

(54) MOBILE TERMINAL BOOTH, MASKING SYSTEM AND MASKING SOUND GENERATION METHOD WITH SOUND MASKING FUNCTION

(71) Applicant: INTERMAN Corporation, Kagoshima (JP)

(72) Inventor: Shigeki Uetabira, Kagoshima (JP)

(73) Assignee: INTERMAN Corporation, Kagoshima (JP)

( * ) Notice: Subject to any disclaimer, the term of this patent is extended or adjusted under 35 U.S.C. 154(b) by 144 days.

(21) Appl. No.: 17/769,823

(22) PCT Filed: Oct. 10, 2020

(86) PCT No.: PCT/JP2020/038407
§ 371 (c)(1),
(2) Date: Apr. 18, 2022

(87) PCT Pub. No.: WO2021/079761
PCT Pub. Date: Apr. 29, 2021

(65) Prior Publication Data
US 2022/0375448 A1 Nov. 24, 2022

(30) Foreign Application Priority Data
Oct. 24, 2019 (JP) ................................ 2019-193561

(51) Int. Cl.
*G10K 11/162* (2006.01)
*E04H 1/12* (2006.01)
(Continued)

(52) U.S. Cl.
CPC ......... *G10K 11/1754* (2020.05); *E04H 1/125* (2013.01); *G10K 11/162* (2013.01); *H04R 1/025* (2013.01)

(58) Field of Classification Search
CPC ............ G10K 11/1754; G10K 11/162; G10K 11/168; G10K 11/16; G10K 11/175;
(Continued)

(56) References Cited

U.S. PATENT DOCUMENTS

2003/0107478 A1* 6/2003 Hendricks ............. H04K 3/825 340/311.2
2005/0067557 A1* 3/2005 Wong .................. G09B 19/167 250/221
(Continued)

FOREIGN PATENT DOCUMENTS

JP H08-296335 A 11/1996
JP 2006-267174 A 10/2006
(Continued)

OTHER PUBLICATIONS

International Search Report mailed on Dec. 15, 2020 in corresponding International Application No. PCT/JP2020/038407; 11 pages (with English Translation).

*Primary Examiner* — Carolyn R Edwards
*Assistant Examiner* — Friedrich Fahnert
(74) *Attorney, Agent, or Firm* — Maier & Maier, PLLC

(57) ABSTRACT

A mobile terminal booth with a sound masking function includes a sound absorbing panel which partitions a space as viewed from the above to provide a place where a user of a mobile terminal can have a telephone conversation; a speaker provided to emit sounds to an outside of the mobile terminal booth; and a masking sound generation unit provided to emit a masking sound through the speaker. The harsh-sounding high frequency components of the masking sound are attenuated so that the masking sound gives less uncomfortable feeling to persons surrounding the mobile
(Continued)

terminal booth. This masking sound is generated by attenuating a high frequency component of a raw sound material including a natural sound.

3 Claims, 12 Drawing Sheets

(51) Int. Cl.
*G10K 11/175* (2006.01)
*H04R 1/02* (2006.01)

(58) Field of Classification Search
CPC .. E04H 1/125; E04H 1/14; E04H 1/12; H04R 1/025; E04B 1/86; E04B 2/74
USPC .......................................................... 381/73.1
See application file for complete search history.

(56) References Cited

U.S. PATENT DOCUMENTS

| | | | | |
|---|---|---|---|---|
| 2011/0182438 | A1 | 7/2011 | Koike et al. | |
| 2013/0163778 | A1 | 6/2013 | Ito et al. | |
| 2013/0185061 | A1* | 7/2013 | Arvanaghi | G10K 11/1754 704/201 |
| 2014/0352234 | A1 | 12/2014 | Uetabira | |
| 2015/0055790 | A1* | 2/2015 | Kawakami | G10K 11/17861 381/73.1 |
| 2016/0199241 | A1 | 7/2016 | Rapoport | |
| 2016/0277834 | A1 | 9/2016 | Hata et al. | |
| 2018/0091106 | A1* | 3/2018 | Suyama | G08C 17/02 |

FOREIGN PATENT DOCUMENTS

| | | | |
|---|---|---|---|
| JP | 2011-154141 | A | 8/2011 |
| JP | 2012-73411 | A | 4/2012 |
| JP | 2012-113130 | A | 6/2012 |
| JP | 2012-194415 | A | 10/2012 |
| JP | 2013-134270 | A | 7/2013 |
| JP | 2013-231931 | A | 11/2013 |
| JP | 2014-043765 | A | 3/2014 |
| JP | 2014-019945 | A | 10/2014 |
| JP | 2016-177204 | A | 10/2016 |
| JP | 2016-534835 | A | 11/2016 |
| JP | 2018-136940 | A | 8/2018 |

* cited by examiner

MOBILE TERMINAL BOOTH, MASKING SYSTEM AND MASKING SOUND GENERATION METHOD WITH SOUND MASKING FUNCTION

FIELD

The present invention relates to a mobile terminal booth, a masking system and a masking sound generation method with a sound masking function for providing an area where a mobile terminal can be used in a public area or the like.

BACKGROUND

Currently, the penetration rate of cellular phones and smartphones has exceeded 100 percent of the Japanese population, and almost all the Japanese have communication devices at all times. Such mobile terminals are convenient to make it possible to collect and transmit information or have telephone conversations, for example, by using spare time effectively on the move. In fact, a significant proportion of people in a park, a building, a street or the like public area are using mobile terminals for some purposes.

However, when a person has a telephone conversation on the move with a mobile terminal, it is common that the person talks beside other passengers, unlike having a telephone conversation with a public phone in a telephone booth. Accordingly, it is often difficult to hear the other person's voice in loud places, e.g., in a crowded street.

Even in a station yard or in a building, noise tends to be reverberating in the enclosed space so that it is sometimes difficult to talk in a relaxed way. Usually, when having a telephone conversation, a person moves close to a wall or the like where noise seems to be somewhat smaller. The noise level near a wall, however, is never small because of reverberating sound reflected from the wall. The reverberating sound often makes it difficult also for the person at the other end to hear the voice.

Taking into consideration the above circumstances, the present applicant has proposed in Patent Document 1 a mobile terminal booth to improve convenience for users of mobile terminals. In accordance with this mobile terminal booth, for example, if the mobile terminal booth is installed in a lobby of a hotel, it is expected that guests can comfortably use mobile terminals, and manners are improved to make better the atmosphere in the hotel.

PATENT DOCUMENT

[Patent Document 1] Japanese Patent Published Application No. 2014-43765

[Patent Document 2] Japanese Patent Published Application No. 2006-267174

SUMMARY

On the other hand, when a cellular phone is used to make conversation, there is the possibility that the content of conversation is heard by surrounding persons so that it is difficult to talk on a cellular phone about private content. While leak of conversation around can be suppressed to some extent by the use of the mobile terminal booth, there is some concern that the conversation is still heard by surrounding persons in a relatively quiet environment. Particularly, this concern becomes large in a building or an office.

On the other hand, masking systems are known (for example, Patent Document 2) with which it becomes hard to hear sound information by outputting wideband noise (masking sound) on the basis of an auditory masking phenomenon. The noise masking effect of such a masking system is increased by turning up the volume of the masking sound. However, since the masking sound is a noise, it is desirable for persons, who are continuously hearing the noise, to minimize the volume of the masking sound as small as possible.

Also, in a situation where a plurality of mobile terminal booths are installed adjacent to each other, there is the possibility that the surrounding sound environment is deteriorated because of masking sounds output from various places.

It is therefore an object of the present invention to provide a masking system which causes less uncomfortable feeling by masking sound.

It is another object of the present invention to provide a mobile terminal booth with a masking system, particularly, to provide a mobile terminal booth with a masking system which causes less uncomfortable feeling by masking sound.

Also, it is a further object of the present invention to provide, in a situation where a plurality of mobile terminal booths are installed adjacent to each other, a method for generating masking sounds from these mobile terminal booths, particularly, to provide a method for generating masking sounds from these mobile terminal booths which causes less uncomfortable feeling by masking sound.

To achieve the above-mentioned objects, the masking system in accordance with the present invention comprises: a speaker installed in the vicinity of a place where a user makes conversation; and a masking sound generation unit configured to generate a masking sound from the speaker, wherein a high frequency component of the masking sound is attenuated.

Also, in the masking system in accordance with the present invention, it is preferred that the masking sound is generated by attenuating a high frequency component of a raw sound material including a natural sound.

Furthermore, in the masking system in accordance with the present invention, it is preferred that the natural sound is murmurs in crowds containing many spoken words.

Furthermore, to achieve the above-mentioned objects, the mobile terminal booth in accordance with the present invention comprises: a sound absorbing panel which partitions a space as viewed from the above to provide an inside place where a mobile terminal can be used; a speaker provided to emit sounds to an outside of the mobile terminal booth; and a masking sound generation unit provided to emit a masking sound through the speaker, wherein a high frequency component of the masking sound is attenuated.

Also, in the masking system in accordance with the present invention, it is preferred that the masking sound is generated by attenuating a high frequency component of a raw sound material including a natural sound.

Furthermore, in the masking system in accordance with the present invention, it is preferred that the natural sound is murmurs in crowds containing many spoken words.

Still further, in the masking system in accordance with the present invention, it is preferred to further comprises a circuit configured to detect a sound inside the mobile terminal booth and determine whether or not the sound contains a large amount of high frequency components wherein when this circuit determines that the sound contains a large amount of high frequency components, the high frequency components of the masking sound are amplified in advance of outputting the masking sound through the speaker.

Still further, in the masking system in accordance with the present invention, it is preferred to further comprises a human detection sensor which detects a user entering the mobile terminal booth, wherein when the human detection sensor detects a user entering the mobile terminal booth, the masking sound is emitted from the speaker.

Still further, in the masking system in accordance with the present invention, it is preferred that when the human detection sensor detects a user entering the mobile terminal booth, a BGM is emitted first from the speaker, and then the masking sound is emitted from the speaker to overlap the BGM.

Also, in a situation where a plurality of mobile terminal booths are installed adjacent to each other, the method for generating masking sounds from the plurality of mobile terminal booths in accordance with the present invention is characterized in that the masking sounds include a sound having a clear temporal context and having a particular meaning, and wherein the masking sounds from the plurality of mobile terminal booths are synchronized with each other.

Furthermore, in the method for generating masking sounds in accordance with the present invention, it is preferred that the sound having a clear temporal context includes any of music, a person's voice, the tweet of a bird and sound of restless waves.

Still further, in the method for generating masking sounds in accordance with the present invention, it is preferred that the masking sounds include the sound having a clear temporal context to which white noise, pink noise or Brownian noise is further added.

Still further, in the method for generating masking sounds in accordance with the present invention, it is preferred that while the masking sound is generated from at least one of the plurality of mobile terminal booths, when generation of the masking sound is to start anew in another mobile terminal booth, this another mobile terminal booth acquires a current playback position of the masking sound from the one mobile terminal booth generating the masking, and starts generation of the masking sound from the playback position as acquired.

Still further, in the method for generating masking sounds in accordance with the present invention, it is preferred that the mobile terminal booth comprises: a sound absorbing panel which partitions a space as viewed from the above to provide a place where a mobile terminal can be used; a speaker provided to emit sounds to an outside of the mobile terminal booth; and a masking sound generation unit provided to generate a masking sound through the speaker.

Effects of the Invention

In accordance with the masking system of the present invention, since harsh-sounding high frequency components of a masking sound are attenuated, the masking sound gives less uncomfortable feeling to persons surrounding the mobile terminal booth. Furthermore, also for the user making conversation, the masking sound is relatively not so harsh-sounding.

Also, the mobile terminal booth according to the present invention is provided with the masking sound generation unit so that, when telephone conversation is made in the mobile terminal booth, the content of conversation is inaudible for persons outside the mobile terminal booth. Accordingly, it is possible to protect speech privacy. Also, since the masking sound generation unit emits a masking sound whose harsh-sounding high frequency components are attenuated, the masking sound gives less uncomfortable feeling to persons surrounding the mobile terminal booth. Furthermore, also for the user having telephone conversation in the mobile terminal booth, the masking sound is relatively not so harsh-sounding.

Still further, in accordance with one preferred embodiment, a sound material having a particular meaning is used as the masking sound such as music, a person's voice, the tweet of a bird, sound of restless waves, or the like, so that it is possible to lessen the deterioration of the sound environment due to the masking sound. Still further, when a plurality of mobile terminal booths are installed adjacent to each other, the masking sounds output from these mobile terminal booths shall not interfere with each other and confuse the listeners.

Still further, the masking effect can be enhanced from both psychological and auditory aspects by making use of a masking sound having a particular meaning and furthermore superimposing noise having no meaning (wideband noise) such as white noise, pink noise or Brownian noise on this masking sound. Namely, the masking sound having a particular meaning makes the listener turn his mind apart from the conversation inside of the mobile terminal booth, and the wideband noise makes formation of the conversation sound in the mobile terminal booth unclear and makes it difficult to hear by ears.

DETAILED DESCRIPTION

In what follows, a mobile terminal booth with sound masking function in accordance with an embodiments of the present invention will be explained with reference to the accompanying drawings. This mobile terminal booth can be installed inside a building such as a hotel, an office building or the like. When making a call, a user of a cellular phone can get away from reverberating sound by entering this mobile terminal booth to have telephone conversation. It is also possible to have conversation while preventing content of the conversation from being heard by others nearby. Furthermore, the user can use a cellular phone without worrying about other people who might be looking at the user.

Figure 1:
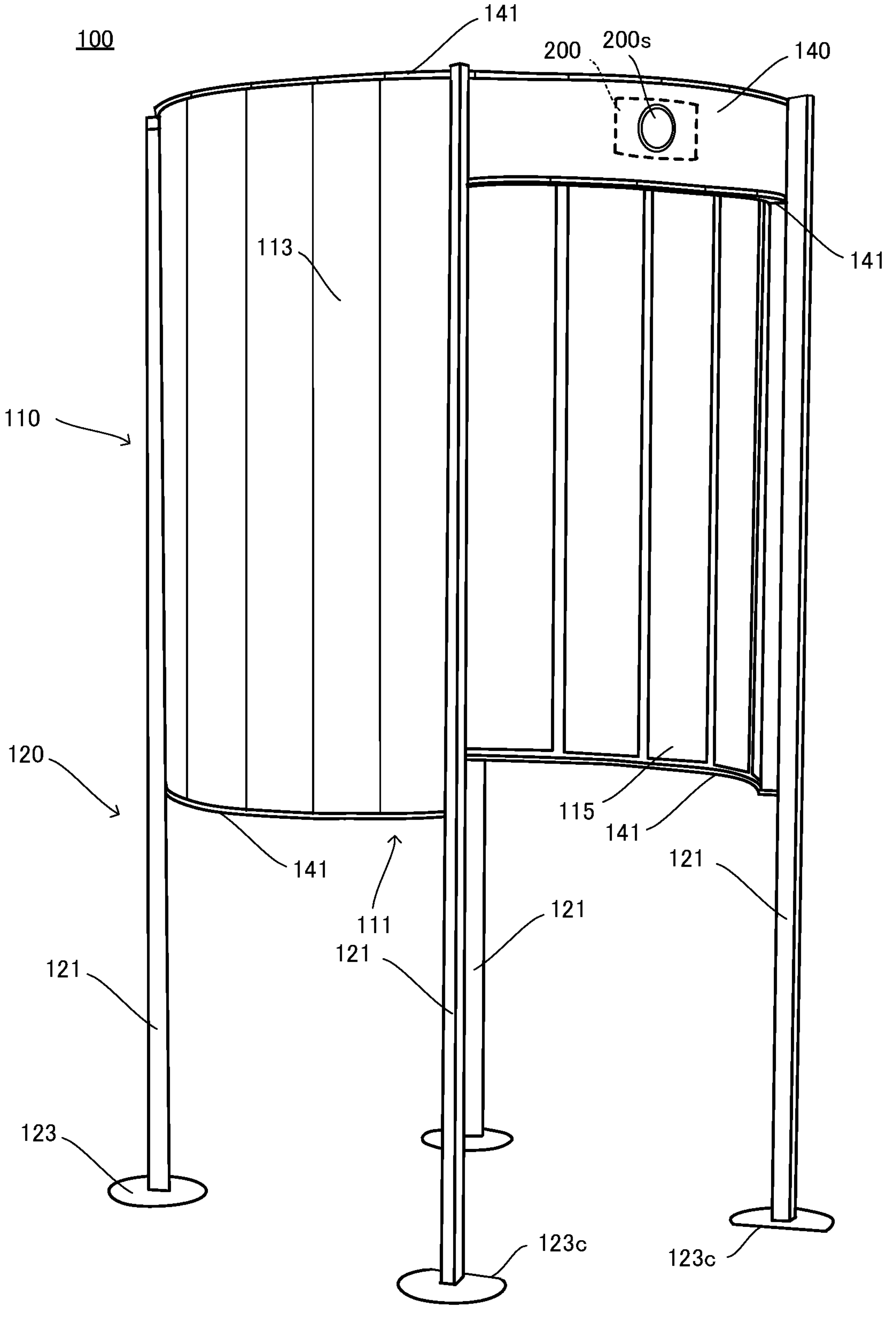
FIG. 1 is a perspective view for showing a mobile terminal booth in accordance with an embodiment of the present invention.

FIG. 1 is a perspective view for showing a mobile terminal booth in accordance with the embodiment of the present invention. This mobile terminal booth 100 includes a sound absorbing unit 110 in the form of a cylinder having a front opening, and a support frame 120 for supporting the sound absorbing unit 110. Each of them can be carried as several constituent parts and assembled in an installation site.

The sound absorbing unit 110 can be assembled by connecting a number of plate-like sound absorbing panels 111 in the form of an arch in a plan view. Each sound absorbing panel is, for example, 120 cm wide, 60 cm high and 3 cm thick. Also, the support frame 120 includes four pipes (support posts) to be vertically connected to the sound absorbing unit 110, and adjuster foots 123 made of steel and attached to the bottom surfaces of the pipes 121.

The adjuster foot 123 is a dislike plate, part of which is cut off along the entrance in the front side of the sound absorbing unit 110. This cut-off part 123*c* is provided for avoiding interference with a wheel of a wheel chair which is entering the mobile terminal booth 100.

If the length of the pipes 121 is 210 cm, the lower end of the sound absorbing unit 110 is located 90 cm from the floor. The sound absorbing unit 110 is effective when it is slightly taller than the position of the ears of the user. Generally speaking, the upper end of the plate-like sound absorbing panel 111 is located 10 to 15 cm higher than the average height of the country where the mobile terminal booth 100 is installed. The diameter of the sound absorbing unit 110 is 1 m to 1.5 m, for example, 1.2 m. While it is basically suggested to use the mobile terminal booth 100 by one person, the size is such as to accommodate two persons.

The plate-like sound absorbing panel 111 is assembled by mounting a sound absorbing member 115 on an aluminum panel. After mounting the sound absorbing member 115 on the aluminum panel 113, panel caps 141 are fitted onto the top and bottom ends of the aluminum panel 113. Also, as illustrated in the figure, the plate-like sound absorbing panels 111 are connected to each other in the form of a cylinder having an opening in the front side. Furthermore, a fascia 140 is provided above this opening in order to connect the plate-like sound absorbing panel 111 on the both side of the opening. In this case, the angle subtended by the opening and as seen from the center of the cylinder is 90 to 120 degrees, i.e., ¼ to ⅓ of the circumference.

Figure 2:
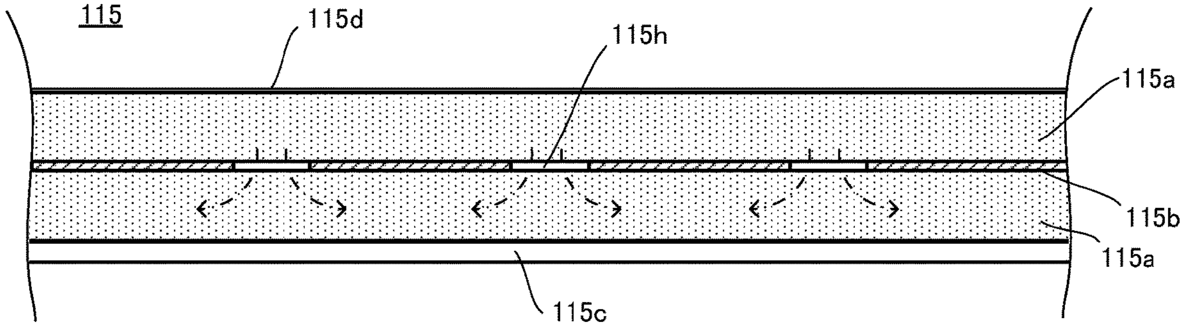
FIG. 2 is an exploded perspective view for showing the structure of the plate-like sound absorbing panel in accordance with the embodiment 1 of the present invention.

The sound absorbing member 115 has a sound absorbing structure as illustrated in FIG. 2. The sound absorbing structure includes a pair of sound absorbing sheets 115*a* bonded as a laminate together with an intervening thin vinyl film 115*b* (resin sheet) therebetween. The vinyl film 115*b* functions as a sound scattering. The sound absorbing sheet 115*a* is made of a needle felt which functions as a sound absorbing material. Other sound absorbing material includes glass wool, thermo wool, bestray, softray, phenol resin, and polyurethane. The thickness of the sound absorbing sheet 115*a* is for example 1 to 2 cm, and the thickness of the vinyl film 115*b* is for example 0.1 mm through 0.5 mm. Furthermore, the back side of the sound absorbing member 115 is covered by a soft polyvinyl chloride plate 115*c*. Also, the other inner side is covered with a cloth 115*d*. The total thickness of the sound absorbing member 115 is thereby about 2 to 4 cm.

Figure 3:
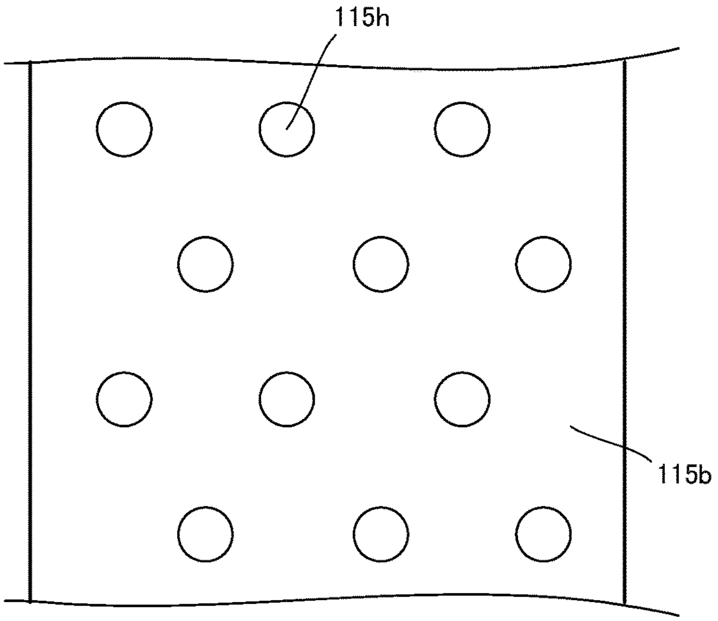
FIG. 3 is a plan view for showing openings opened through a vinyl film which is inserted between the sound absorbing member shown in FIG. 2.

As illustrated in FIG. 3, the vinyl film 115*b* is provided with a number of openings 115*h*. For example, the diameter of each opening 115*h* is 2 cm, and adjacent ones thereof are located 7 cm distant from each other. With the openings 115*h*, the incident sound waves can be effectively scattered in the lateral direction to enhance the sound absorbing capabilities of the sound absorbing sheet 115*a*. In addition, the openings 115*h* allow part of the incident sound waves to pass through the vinyl film 115*b* to control the balance between reflection and transmission, such that they functions as a sound controlling means.

The vinyl film 115*b* and the sound absorbing sheets 115*a* are joined with a viscous adhesive. The viscous adhesive is applied also between the sound absorbing sheets 115*a* through the openings 115*h*. While maintaining a certain viscosity, this viscous adhesive intervenes between the vinyl film 115*b* and the sound absorbing sheet 115*a* with a certain viscosity being maintained. Also, while maintaining a certain viscosity, this viscous adhesive intervenes between the sound absorbing sheets 115*a* through the openings 115*h*. In other words, it is important that, even when the sound absorbing member 115 is used, the viscous adhesive shall not entirely be solidified but can maintain its slimy state.

Such a sound absorption structure is characterized by capability of absorbing incident sound waves in a wide range from very low frequencies to very high frequencies. Particularly, with respect to the purpose of the present invention, it is important that the sound absorbing structure can substantially dump sound pressure levels at 500 Hz or higher frequencies which phone users feels noisy. On the other hand, it is considered difficult to maintain sound absorbing capabilities at low frequencies. However, even with the sound absorption structure as described above, the sound absorbing capability in low frequency bands is still low in comparison with in high frequency bands.

The mobile terminal booth according to the present invention is provided with a masking sound generation unit. In the case of this embodiment, the masking sound generation unit 200 is implemented within the fascia 140. This masking sound generation unit 200 is a device which emits a masking sound from a speaker 200*s* to make sound information of voices in the mobile terminal booth less audible. Also, this masking sound generation unit 200 is provided with a microphone, which is not shown in the figure, for collecting sounds inside the mobile terminal booth. Furthermore, this masking sound generation unit 200 is provided with a human detection sensor, which is not shown in the figure. The human detection sensor detects human entering the mobile terminal booth.

Figure 4:
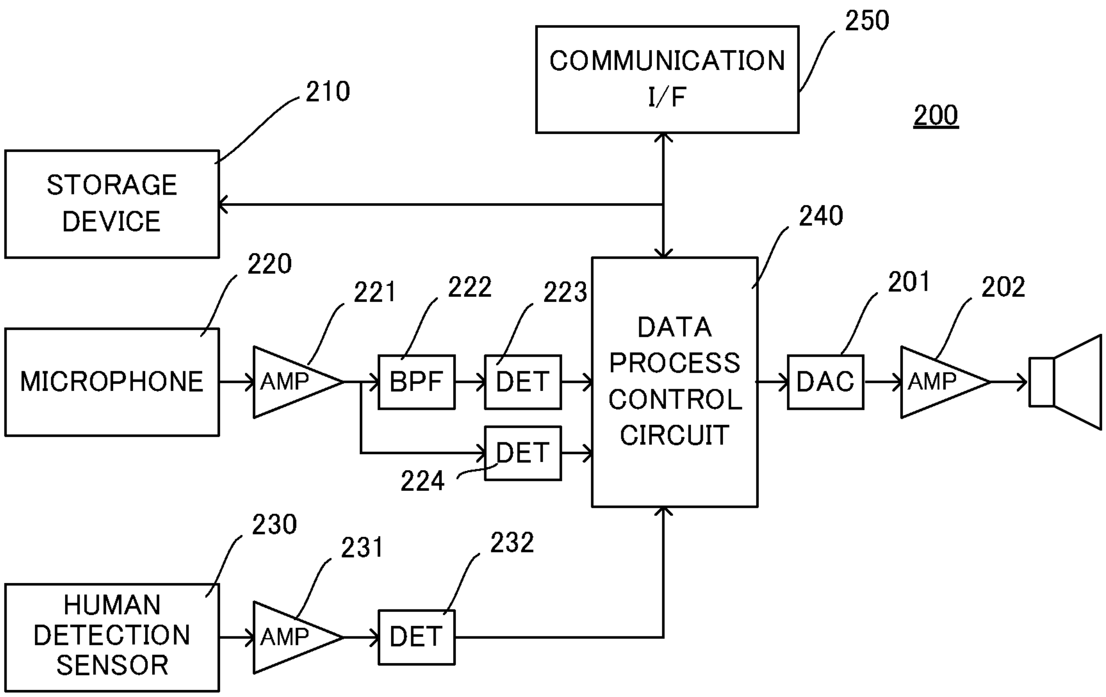
FIG. 4 is a block diagram of a masking sound generation unit installed in the mobile terminal booth shown in FIG. 1.

FIG. 4 is a block diagram of the masking sound generation unit 200 according to the present embodiment. The masking sound generation unit 200 is provided with a storage device 210, a microphone 220, a human detection sensor 230, a data process control circuit 240 and a communication interface 250.

The storage device 210 is implemented, for example, with a micro-SD memory card in which are stored sound sources for generating a masking sound and BGM (Background Music). The microphone 220 is oriented to the inside of this mobile terminal booth to collect sounds inside the mobile terminal booth, for example, the voice of a user during telephone conversation. The human detection sensor 230 is installed on the center of a ceiling of the mobile terminal booth to detect entrance of a user by detecting infrared rays. The data process control circuit 240 generates a masking sound from the speaker 200*s* through a DAC 201 and an amplifier 202 on the basis of signals from the microphone 220 and the human detection sensor 230.

The communication interface 250 is a module for transmitting and receiving data to/from the Internet and controlled by the data process control circuit 240. The communication system of the communication interface 250 includes a public network such as a telephone line, an ISDN line, an ADSL line or an optical line, a dedicated communication line, the third generation (3G) communication system such as WCDMA® and CDMA2000, the fourth generation (4G) communication system such as LTE, the fifth (5G) generation or later communication system, and a wireless communication network such as wifi® or Bluetooth®.

The signal output from the microphone 220 is amplified by the amplifier 221, passed through a bandpass filter 222, and detected by a detection circuit 223 which outputs a detection result to the data process control circuit 240. The bandpass filter 222 allows only signals in a high frequency band to pass, for example, to output a large output signal to the detection circuit 223 when the input signal contains a substantially amount of high frequency components, such as a female voice. When the output of the bandpass filter 222 is greater than a predetermined level, the detection circuit 223 outputs a detection signal to the data process control circuit 240. The output of the amplifier 221 is output also to a detection circuit 224. When the input signal contains a smaller amount of high frequency components, such as a male voice, the detection circuit 223 outputs no detection signal. Even in such a case, since the detection circuit 224 outputs a detection signal, the detection circuit 224 serves as a sound presence detection circuit.

The human detection sensor 230 detects infrared radiation inside the mobile terminal booth, and outputs a detection signal when detected. This detection signal is input to and amplified by the amplifier 231, and output to a detection circuit 232. When receiving an input signal above a predetermined level, the detection circuit 232 outputs a detection signal to the data process control circuit 240.

The sound sources stored in the storage device 210 are prepared by the use of raw sound materials which are prepared by mixing natural sounds such as murmurs in crowds containing many spoken words with Brownian noise or the like. Particularly, in the case of the present invention, the storage device 210 stores sound sources which are prepared by attenuating high frequency components of such raw sound materials containing natural sounds.

In the case where such sound sources prepared by attenuating high frequency components of raw sound materials containing natural sounds are used as a masking sound, there is the following advantages. Namely, while the masking sound substantially reduces intelligibility of human speech such as telephone conversation, the masking sound it self is only unpleasant noise to other persons than the speaking persons. Particularly, the high frequency components of this noise are harsh-sounding. Since this high frequency components are attenuated in accordance with the present invention, it is possible to lessen the deterioration of the sound environment around the mobile terminal booth due to the masking sound.

Usually, when the high frequency components of the masking sounds are attenuated, the masking effect to the masking target such as human voice is substantially lessened. This is because the high frequency components of the human voice are very important elements for intelligibility of speech contents.

However, the high frequency components of voices are absorbed in the mobile terminal booth so that the sounds leaking from the mobile terminal booth includes high frequency components which are attenuated. Accordingly, even if the high frequency components of the masking sounds are attenuated, the masking effect is maintained.

Specifically, it is known that sounds in this mobile terminal booth are substantially attenuated in a frequency range of no lower than 2 kHz, when heard outside the mobile terminal booth. Accordingly, the raw sound materials as described above are attenuated in a frequency range of no lower than 2 kHz. In addition to this, the higher the frequency, the greater the raw sound materials is attenuated, for example, such as the attenuating amount is gradually increased from 0 dB at 2 kHz to 10 dB at 10 kHz.

Meanwhile, while the storage device 210 stores, as a masking sound, raw sound materials whose high frequency components are attenuated, the present invention is not limited thereto. For example, the masking sound can be obtained by storing raw sound materials containing natural sounds in the storage device 210, and attenuating the high frequency components of the raw sound materials output from the storage device 210.

The masking sounds or the raw sound materials stored in the storage device 210 can readily be updated by downloading new sound data through the communication interface 250 and the Internet. Accordingly, when more an effective masking sound or raw sound material is developed, it can be used immediately. In the case where a masking sound is downloaded through the Internet, the masking sound is generated by attenuating the high frequency component of a raw sound material at the download source.

The masking sound generation unit 200 for the mobile terminal booth having the structure as described above operates as follows. First, when a user enters the mobile terminal booth, the human detection sensor 230 detects the entrance to output a detection signal which is input to the data process control circuit 240. The data process control circuit 240 then has the speaker 200*s* emit a BGM by reading a sound source (BGM) stored in the storage device 210. The reproduction volume of the BGM is gradually increased (fade-in) to a predetermined level from a zero level.

Next, when a user starts telephone conversation, it is determined whether or not the user's voice contains a large amount of high frequency components with reference to the detection signals of the detection circuit 223 and detection circuit 224. In the case where the user's voice does not contain a large amount of high frequency components, such as a male voice, the masking sound is emitted from the speaker 200*s* as it is. On the other hand, in the case where the user's voice contains a large amount of high frequency components, such as a female voice, the high frequency components of the masking sound is slightly amplified, and the amplified masking sound is emitted from the speaker 200*s*. Namely, as a result in the case of female voices, the high frequency attenuation of the masking sound are made small as compared with the case of male voices.

When the user exits the mobile terminal booth and the human detection sensor 230 stops outputting a detection signal, the data process control circuit 240 stops outputting the masking sound and the reproduction volume of BGM is gradually decreased (fade-out) to a zero level.

While the above masking system can be most effectively used particularly in combination with a mobile terminal booth, the harsh-sounding high frequency components of the masking sound as used are attenuated so that the masking sound gives less uncomfortable feeling to persons surrounding the mobile terminal booth. Accordingly, such a masking sound can be effectively used also for other situations than used for mobile terminal booth. For example, a speaker can be installed in front of the entrance of a meeting room to reproduce a masking sound whose high frequency components are attenuated from the masking sound generation unit as described above. By this configuration, it is possible to realize a masking system which prevents conversation leaking from the meeting room from being heard by an outside person, and causes less uncomfortable feeling by masking sound.

Next, a mobile terminal booth with sound masking function in accordance with another embodiment of the present invention will be explained. This embodiment is implemented to inhibit masking sounds output from a plurality of mobile terminal booths installed close to each other such as within the same room from interfering with each other. The elements of each mobile terminal booth other than the masking sound generation unit 200 are equivalent to those of the previous embodiment so that only the masking sound generation unit 200 will be hereinbelow described.

Figure 5:
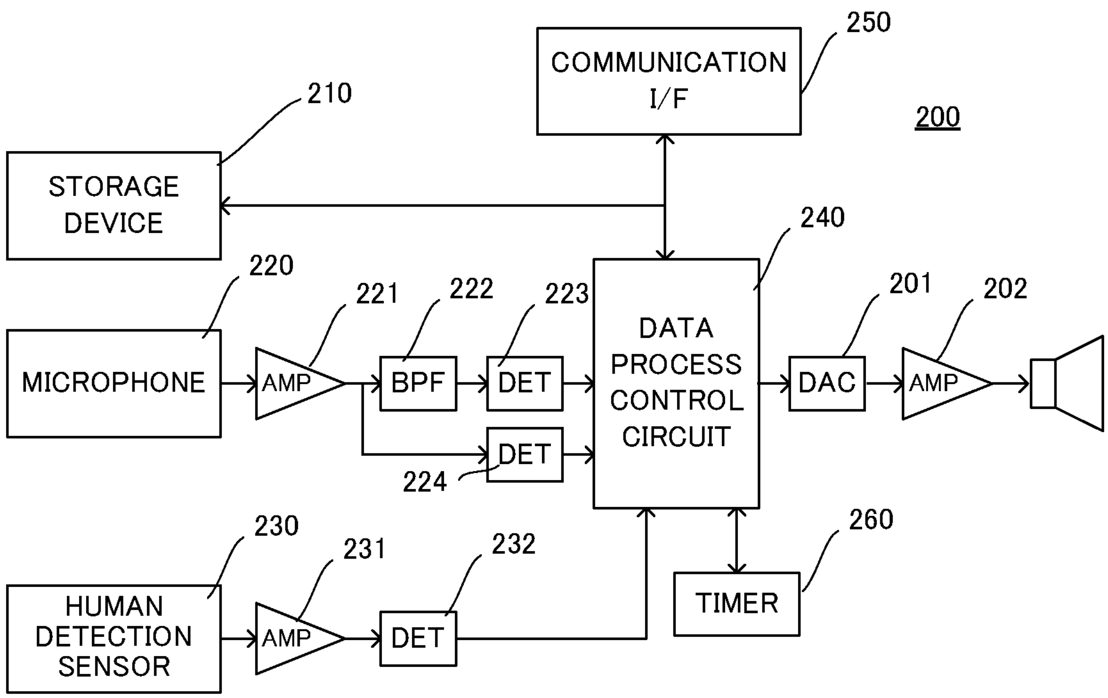
FIG. 5 is a block diagram for showing a masking sound generation unit in accordance with another embodiment of the present invention.

FIG. 5 is a block diagram for showing the masking sound generation unit 200 in accordance with the present embodiment. The masking sound generation unit 200 is provided with a storage device 210, a microphone 220, a human detection sensor 230, a data process control circuit 240 and a communication interface 250, and a timer 260.

The storage device 210 is implemented, for example, with a micro-SD memory card in which are stored sound sources for generating a masking sound. The microphone 220 is oriented to the inside of this mobile terminal booth to collect sounds inside the mobile terminal booth, for example, the voice of a user during telephone conversation. The human detection sensor 230 is installed on the center of a ceiling of the mobile terminal booth to detect entrance of a user by detecting infrared rays. The data process control circuit 240 generates a masking sound from the speaker 200*s* through a DAC 201 and an amplifier 202 on the basis of signals from the storage device 210, the microphone 220 and the human detection sensor 230.

The communication interface 250 is a module for connecting mobile terminal booths with each other for transmitting and receiving data among the mobile terminal booths through a wired LAN such as Ethernet or a wireless LAN such as Wifi®, and controlled by the data process control circuit 240. This communication interface 250 can be used also for accessing the Internet.

The signal output from the microphone 220 is amplified by the amplifier 221, passed through a bandpass filter 222, and detected by a detection circuit 223 which outputs a detection result to the data process control circuit 240. The bandpass filter 222 allows only signals in a high frequency band to pass, for example, to output a large output signal to the detection circuit 223 when the input signal contains a substantially amount of high frequency components, such as a female voice. When the output of the bandpass filter 222 is greater than a predetermined level, the detection circuit 223 receiving this output signal outputs a detection signal to the data process control circuit 240. The output of the amplifier 221 is output also to a detection circuit 224. When the input signal contains a smaller amount of high frequency components, such as a male voice, the detection circuit 223 outputs no detection signal. Even in such a case, since the detection circuit 224 outputs a detection signal, the detection circuit 224 serves as a sound presence detection circuit.

The human detection sensor 230 detects infrared radiation inside the mobile terminal booth, and outputs a detection signal when detected. This detection signal is input to and amplified by the amplifier 231, and output to a detection circuit 232. When receiving an input signal above a predetermined level, the detection circuit 232 outputs a detection signal to the data process control circuit 240.

In the case of the present invention, a sound material (for example, a music file) having a particular meaning such as music or recitation is stored in the storage device 210 as a masking sound. In the past, noise having no meaning such as white noise, pink noise or Brownian noise is used as a masking sound which makes private content or the like less audible. However, through the investigation experiment of the inventors of the present invention, it has been known that a certain masking effect can be achieved even with a sound material having a particular meaning such as music or recitation.

Namely, a person near the mobile terminal booth tends to listen the content of music or recitation, but tends not to pay attention to the conversation in the mobile terminal booth. In other words, it is found that a sound material having a particular meaning such as music or recitation can be effectively used as a masking sound. In this case, there is the advantage that sound environment is not be deteriorated by a sound material having a particular meaning such as music or recitation.

On the other hand, in the case where a sound material having a particular meaning such as music or recitation is used as a masking sound, there is a fear that part of the conversation content is overheard through breaks in the sound. Because of this, noise having no meaning such as white noise (wideband noise), pink noise or Brownian noise is used together. Even in such a case, because of the existence of the sound material having a particular meaning such as music or recitation, it is possible to lessen the deterioration of the sound environment around the mobile terminal booth by suppressing the volume of this noise having no meaning.

Therefore, the masking sound generation method in accordance with one embodiment of the present invention is characterized by making use of a masking sound having a clear temporal context and having a particular meaning such as music or recitation and superimposing meaningless wideband noise on this masking sound. The wideband noise having no meaning makes formation of the conversation sound in the mobile terminal booth unclear and makes it difficult to hear by ears. On the other hand, the masking sound having a particular meaning such as music or recitation makes the listener turn his mind to the sound such as music or recitation and does not induce the listener to overhear the conversation voice.

On the other hand, in the case where the sound material having a particular meaning such as music or recitation is used as a masking sound for a plurality of mobile terminal booths installed adjacent to each other, there is a problem that does not arise with noise having no meaning used as a masking sound. Namely, sounds of music or recitation from the adjacent mobile terminal booths proceed independent of each other to cause displeasure in hearing the mixed sounds.

Taking it into consideration, in accordance with the present invention, a plurality of mobile terminal booths installed adjacent to each other make communication with each other to synchronize music or the like. By this configuration, since music or the like can be clearly heard, the masking effect can be sufficiently exhibited as expected.

In what follows, a specific method for synchronizing the music sounds output from the plurality of mobile terminal booths will be explained. Synchronization is implemented through network communication by the use of the communication interface 250. In this description, music is employed as a specific example of the masking sound. However, the following explanation is applicable with any other sound material having a particular meaning, i.e., a meaningful sound material having a clear temporal context to which the listener listens with attention. Such sound materials include a person's voice such as recitation, the tweet of a bird and sound of restless waves.

Figure 6:
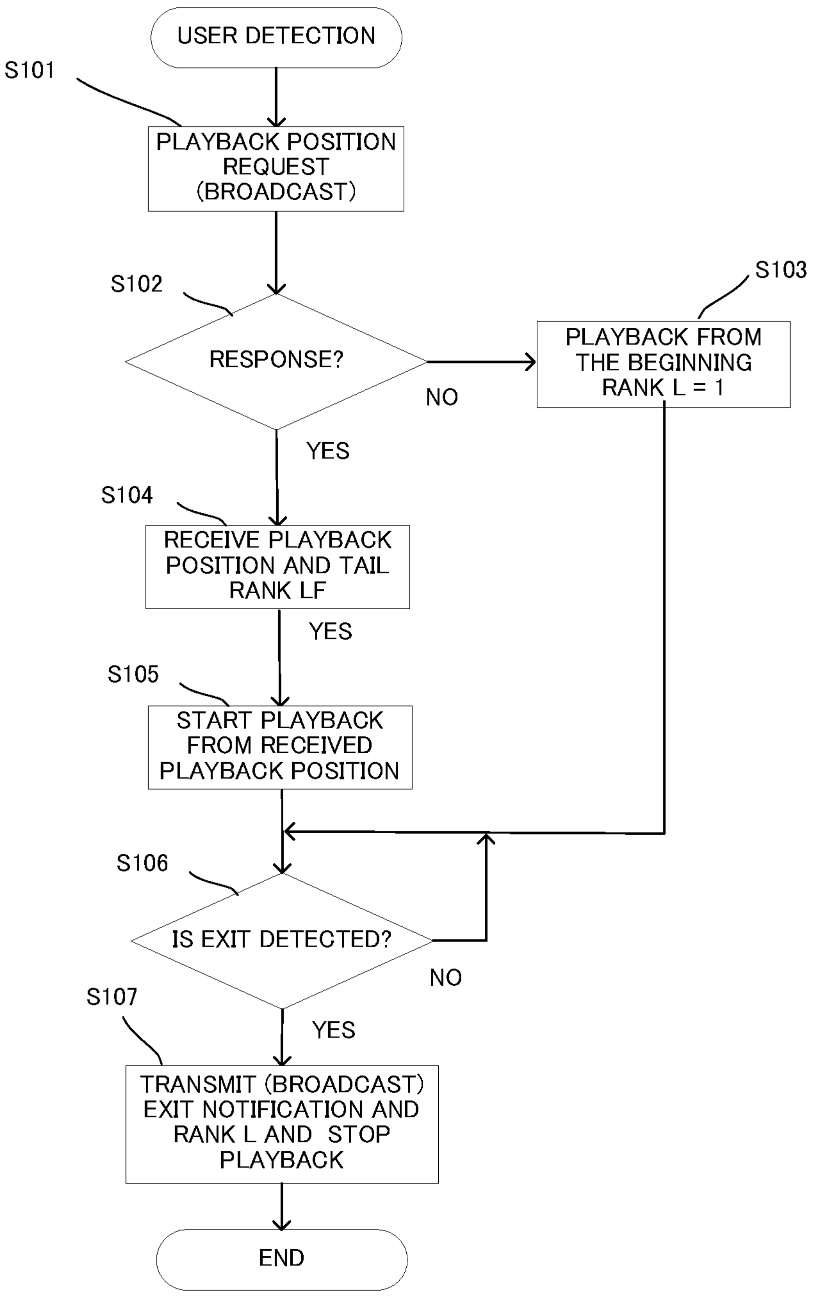
FIG. 6 is a flow chart showing a method of synchronizing music among a plurality of mobile terminal booths in accordance with the another embodiment of the present invention.

FIG. 6 is a flow chart showing a method of synchronizing music among a plurality of mobile terminal booths in accordance with an embodiment of the present invention. The plurality of the mobile terminal booths are network connected to each other through the communication interface 250.

When a user enters one of the mobile terminal booths, the human detection sensor 230 detects the user and outputs a detection signal to the data process control circuit 240. The data process control circuit 240 receives this detection signal and control the communication interface 250 to broadcast a playback position request signal (step 101).

If no response responds to the playback position request signal which is broadcasted (No in step 102), it is determined that there is no mobile terminal booth in which music is played back, and the mobile terminal booth starts playback of music from the beginning of the music file that is set up in advance (step 103). In addition, a variable indicative of the rank L in the mobile terminal booths playing back music is set to "1". The first ranked mobile terminal booth notifies, as a master booth, the playback position of music (the reproduction position of the masking sound source) in response to a playback position request signal output from another mobile terminal booths. The playback position is designated in units of milliseconds counted from at the start of music. Also, at the same time, the first ranked mobile terminal booth notifies the identification number identifying the music that is played back.

If there is a response to the broadcasted playback position request signal (Yes in step 102), i.e., if there is a master booth, the mobile terminal booth receives the identification number identifying the music that is played back by the master booth and the current playback position (in step 104). The mobile terminal booth also receives the rank Lf indicative of the tail of the ranking calculated by adding 1 to the number of the mobile terminal booths currently playing back the music. In other words, this mobile terminal booth is the Lf-th mobile terminal booth among the mobile terminal booths currently playing back the music. Also, the rank L of this mobile terminal booth is set to the tail rank Lf. Then, playback is started from the playback position as received (step 105). Meanwhile, the rank L and the tail rank Lf are separately stored and separately updated as described below.

Figure 7:
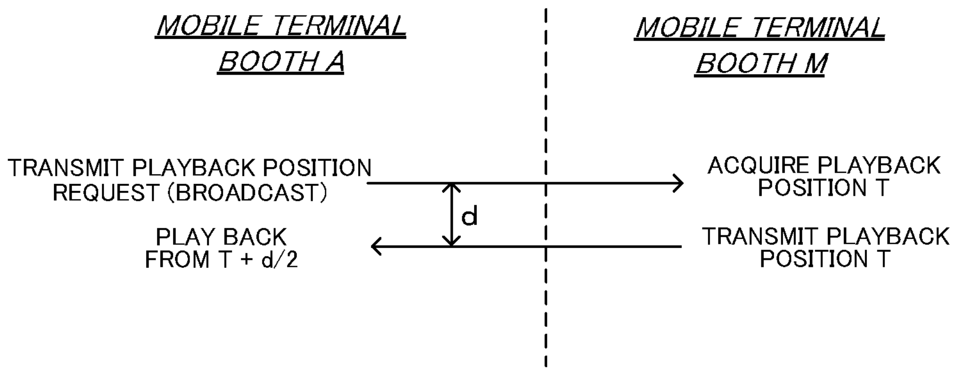
FIG. 7 is a view showing a method of correcting a playback position when synchronizing music among a plurality of mobile terminal booths in accordance with the another embodiment of the present invention.

In practice, if playback is started exactly from the playback position as received, some timing shift may be caused because of communication delay or the like. It is desirable to correct this timing shift. FIG. 7 is a view showing the method of correcting the playback position as received.

The mobile terminal booth A starts the timer at the same time as broadcasting the playback position request signal. Receiving this playback position request signal, the mobile terminal booth M (the master booth) acquires the current playback position T and transmits it to the mobile terminal booth A. The mobile terminal booth A stops the timer with the timing when the playback position T is received to measure the time d required from transmitting the playback position request signal to receiving the playback position T. The actual playback start position is obtained by adding the correction amount d/2 to this playback position T. In this case, it is assumed that the time required from transmitting the playback position request signal to acquiring the playback position T is equal to the time required from acquiring the playback position T to receiving the playback position T.

The playback of music is continued (No in step 106) until the human detection sensor 230 detects exit of a user after the playback of music is started in step 103 or 105. When the human detection sensor 230 detects exit of a user (Yes in step 106), the mobile terminal booth broadcasts an exit notification and the current rank L of this mobile terminal booth. Then the playback of music is stopped.

This is the process from starting the playback of music when a user enters one of the mobile terminal booths to stopping the playback of music after the user exits. Together with this process shown in FIG. 6, the processes shown in FIG. 8 and FIG. 9 are simultaneously performed.

Figure 8:
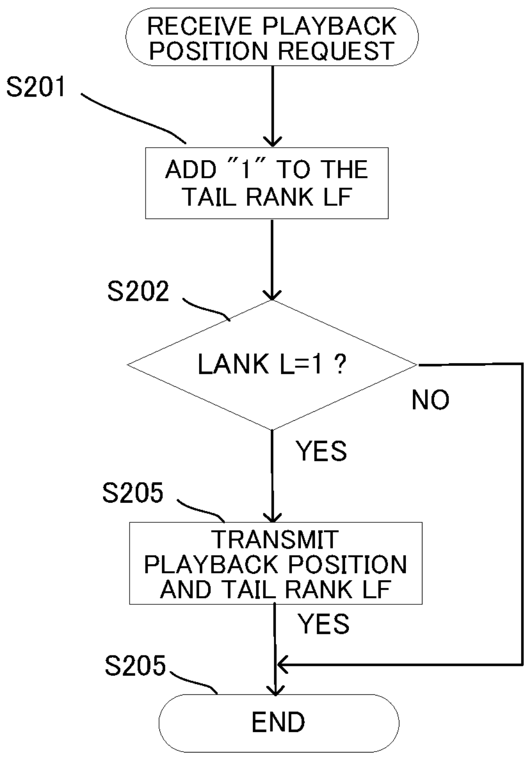
FIG. 8 is a flow chart for showing the process performed when a mobile terminal booth playing back music receives a playback position request signal broadcasted from another mobile terminal booth when synchronizing music among a plurality of mobile terminal booths in accordance with the another embodiment of the present invention.

FIG. 8 is a flow chart for showing the process performed when a mobile terminal booth playing back music receives a playback position request signal broadcasted from another mobile terminal booth. Receiving the playback position request signal, the mobile terminal booth adds "1" to the tail rank Lf saved by the mobile terminal booth (step 201). In other words, the tail rank Lf is to increase by one because the mobile terminal booths playing back music is increased by one.

Next, it is determined whether or not the rank L of the mobile terminal booth is "1" (step 202). If the rank L of the mobile terminal booth is not "1" (No in step 202), the mobile terminal booth is not the master booth so that the process is simply terminated. Contrary to this, if the rank L of the mobile terminal booth is "1" (Yes in step 202), the mobile terminal booth is the master booth so that the mobile terminal booth transmits the current playback position together with the tail rank Lf and the process is terminated.

Figure 9:
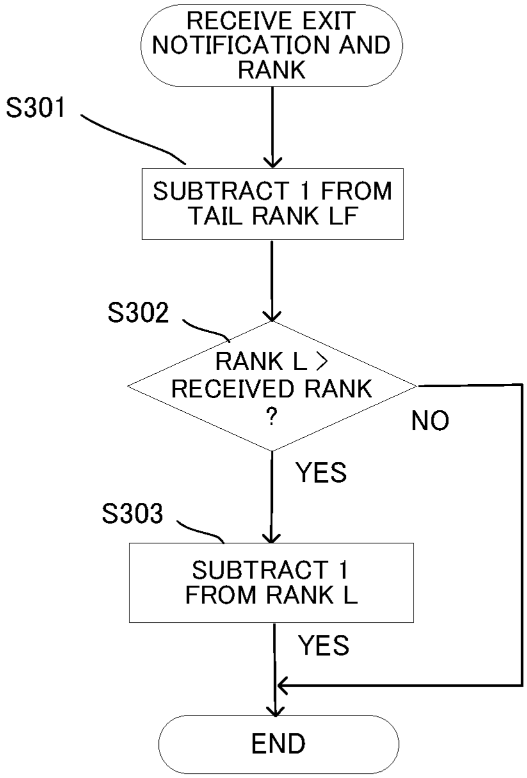
FIG. 9 is a flow chart for showing the process performed when a mobile terminal booth playing back music receives an exit notification and a rank transmitted from another mobile terminal booth when synchronizing music among a plurality of mobile terminal booths in accordance with the another embodiment of the present invention.

FIG. 9 is a flow chart for showing the process performed when a mobile terminal booth playing back music receives an exit notification and a rank transmitted from another mobile terminal booth. Receiving the exit notification, the mobile terminal booth subtracts "1" from the tail rank Lf saved by the mobile terminal booth (step 301). Namely, the tail rank Lf is to decrease by one because the mobile terminal booths playing back music is decreased by one.

Next, it is determined whether or not the rank L of the mobile terminal booth is greater than the received rank (step 302). If the rank L of the mobile terminal booth is not greater than the received rank (No in step 302), the rank L of the mobile terminal booth does not change so that the process is simply terminated. Conversely, if the rank L of the mobile terminal booth is greater than the received rank (Yes in step 302), the rank of the mobile terminal booth decreases so that "1" is subtracted from the rank L of the mobile terminal booth and the process is terminated (step 303).

As has been discussed above, by performing the processes shown in FIG. 8 and FIG. 9 together with the process shown in FIG. 6, some mobile terminal booth always becomes a master booth so that the playback position is notified to a mobile terminal booth which is to start the playback and it is possible to establish synchronism of the playback timings among the mobile terminal booths. Accordingly, even when a plurality of mobile terminal booths play back music, the sounds from the mobile terminal booths do not interfere with each other and function as one masking sound to which the surrounding person pays attention but not to the conversation in the mobile terminal booths.

Incidentally, in the case of the masking sound generation unit 200 in accordance with the present embodiment, a masking sound consisting mainly of noise having no meaning (wideband noise) is also stored in the storage device 210 and used as a masking sound in combination with a sound material having a particular meaning such as music or recitation to enhance the masking effect of the sound material having a particular meaning.

Specifically, noise having no meaning such as white noise, pink noise or Brownian noise is superimposed on music as the masking sound and reproduced with the timing when a detection signal is output from the detection circuit 224, i.e., when a user having entered the mobile terminal booth starts conversation.

In other words, playback of music is started with the timing when the user enters the mobile terminal booth as described above, and then the masking sound mainly consisting of noise having no meaning is reproduced with the timing when the user starts conversation. The reproduction of the masking sound mainly consisting of noise having no meaning is stopped with the timing when the user exits the mobile terminal booth in the same manner as the playback of music. Needless to say, synchronization is unnecessary for the noise having no meaning.

The sound sources of the masking sound mainly consisting of noise having no meaning are prepared by the use of raw sound materials which are prepared by mixing natural sounds such as murmurs in crowds containing many spoken words with Brownian noise or the like. Particularly, in the case of the present embodiment, the storage device 210 is used to store sound sources which are prepared by attenuating high frequency components of such raw sound materials containing natural sounds.

In the case where such sound sources prepared by attenuating high frequency components of raw sound materials containing natural sounds are used as a masking sound, there is the following advantages. Namely, while the masking sound substantially reduces intelligibility of human speech such as telephone conversation, the masking sound it self is only unpleasant noise to other persons than the speaking persons. Particularly, the high frequency components of this noise are harsh-sounding. Since the high frequency components are attenuated in accordance with the present embodiment, it is possible to lessen the deterioration of the sound environment around the mobile terminal booths due to the masking sound mainly consisting of noise having no meaning.

In addition, when the raw sound material of the masking sound mainly consisting of noise having no meaning is used, it is determined whether or not the user's voice contains a large amount of high frequency components with reference to the detection signals of the detection circuit 223 and detection circuit 224. Then, in the case where the user's voice contains a large amount of high frequency components, such as a female voice, the high frequency components of the masking sound is slightly amplified, and the amplified masking sound is emitted from the speaker **200*s***. Namely, as a result in the case of female voices, the high frequency attenuation of the masking sound are made small.

As has been discussed above, persons outside the mobile terminal booth pay attention to music as a masking sound having a particular meaning but not to the conversation which is made in the mobile terminal booth and made less audible due to the masking sound mainly consisting of noise having no meaning. As a result, the whole masking effect is enhanced by the combination of such a masking sound having a particular meaning and a masking sound mainly consisting of noise having no meaning. In addition, the volume of the masking sound mainly consisting of noise having no meaning is suppress to be small as compared with the conventional volume thereof.

In the case of the example shown in FIG. 6 through FIG. 9, the mobile terminal booth which is a master booth continuously functions as a master booth until the user exits the mobile terminal booth, and when the user exits the mobile terminal booth another mobile terminal booth succeeds as the next master booth. Alternatively, the master booth can continuously function as a master booth even if the user exits the master booth as long as there is another mobile terminal booth in which music is continuously played back. This alternative will be explained as another example of the present invention with reference to FIG. 10 through FIG. 12.

Figure 10:
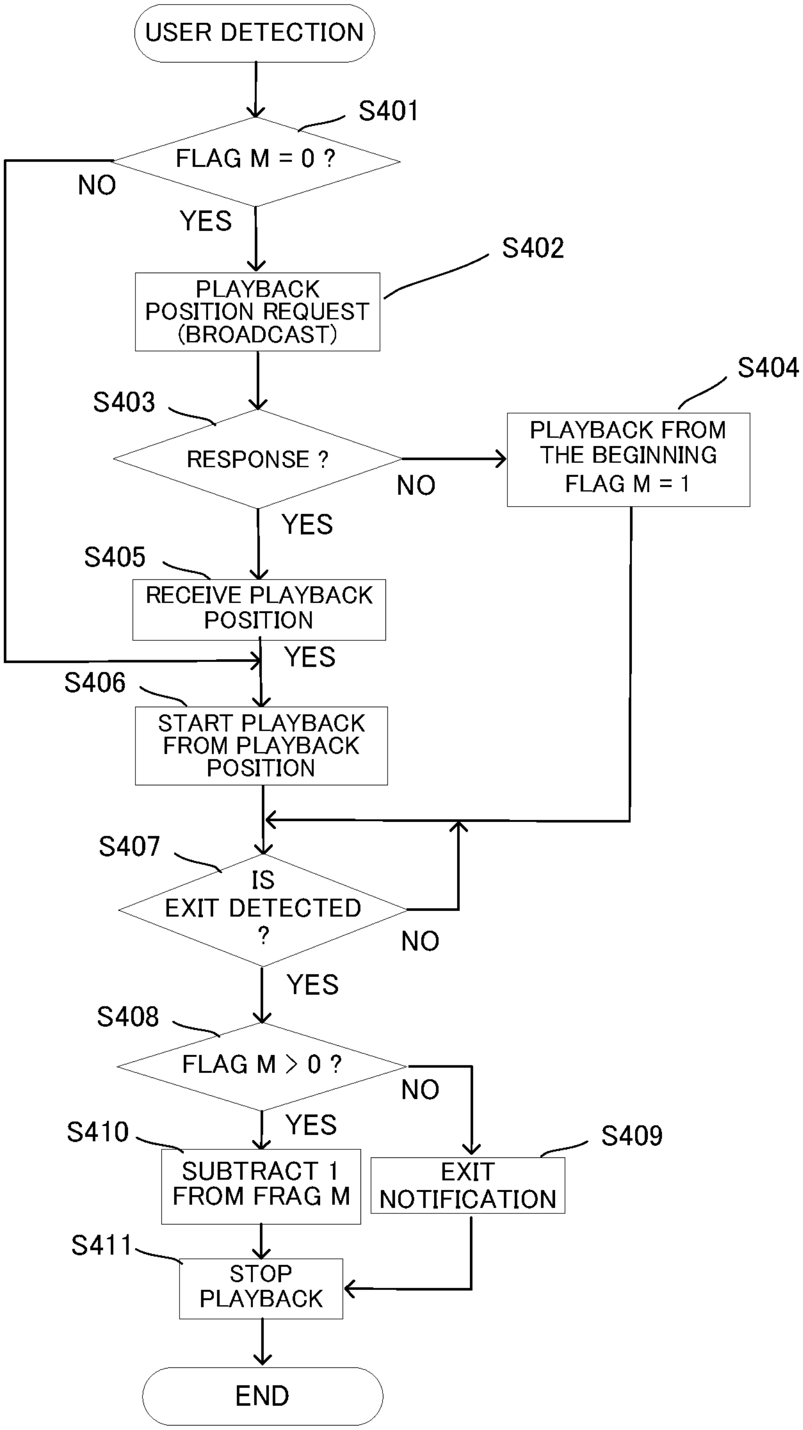
FIG. 10 is a flow chart showing a method of synchronizing music among a plurality of mobile terminal booths in accordance with another example of the present invention.

FIG. 10 is a flow chart showing another method of synchronizing music among a plurality of mobile terminal booths in accordance with another embodiment of the present invention. When a user enters one of the mobile terminal booths, the human detection sensor 230 detects the user and outputs a detection signal to the data process control circuit 240. Then, the data process control circuit 240 refers to the flag M which is an internal variable. This flag M holds an integer value which indicates, when taking 1 or greater value, that the mobile terminal booth is the master booth. The value stored in the flag M of the master booth indicates the number of mobile terminal booths which are currently playing back music.

If the flag M is 0 (Yes in step 401), the mobile terminal booth is not the master booth and therefore broadcasts a playback position request signal (step 402). Conversely, if the flag M is not 0 (No in step 401), the mobile terminal booth is the master booth and therefore plays back music from the current playback position without broadcasting a playback position request signal (step 406).

If no response is responds to the playback position request signal which is broadcasted (No in step 403), it is determined that there is no other mobile terminal booth which manages the playback position, i.e., no master booth, and the mobile terminal booth starts reproduction of music from the beginning of the music file that is set up in advance followed by setting the flag M to "1" (step 404) to be the master booth. The mobile terminal booth whose flag M is "1" or greater functions as the master booth which notifies the playback position of music in response to the playback position request signal broadcasted by another mobile terminal booth. The playback position is designated in units of milliseconds from the beginning of music. In addition, at the same time, the identification number identifying the music that is played back is notified together with the playback position.

If there is a response to the playback position request signal which is broadcasted (Yes in step 403), i.e., if there is a master booth, the mobile terminal booth receives the identification number identifying the music that is played back and the current playback position (in step 405). Then, playback is started from the playback position as received (step 406).

As has been discussed above, in practice, if playback is started exactly from the playback position as received, some timing shift may be caused because of communication delay or the like. It is desirable to correct this timing shift. The playback of music is thereby started after the playback position is corrected as described above with reference to FIG. 7.

After starting the playback of music in step 406, music is continuously played back (NO in step 407) until the human detection sensor 230 detects exit of the user. When the human detection sensor 230 detects exit of the user (YES in step 407), it is determined in step 408 whether or not the flag M is greater than "0", i.e., whether or not the mobile terminal booth is the master booth.

If the flag M is not greater than "0" (No in step 408), i.e., if the mobile terminal booth is not the master booth, an exit notification is broadcasted (step 409) and the playback of music is stopped (step 411). If the flag M is greater than "0" (Yes in step 408), i.e., if the mobile terminal booth is the master booth, the flag M is decremented by one (step 410) and the playback of music is stopped (step 411).

However, in the case where the mobile terminal booth which stops the playback of music in step 411 is the master booth, if the flag M is greater than "0" even after decrement by "1", i.e., if there is another mobile terminal booth in which a user enters and from which music is continuously played back, the music playback time is continuously counted. This is because it is necessary to notify the playback position of music to a mobile terminal booth when a user enters this mobile terminal booth (step 502 in FIG. 11 to be described below).

This is the process from starting the playback of music when a user enters one of the mobile terminal booths to stopping the playback of music after the user exits in accordance with this another embodiment. Together with this process shown in FIG. 10, the processes shown in FIG. 11 and FIG. 12 are simultaneously performed.

Figure 11:
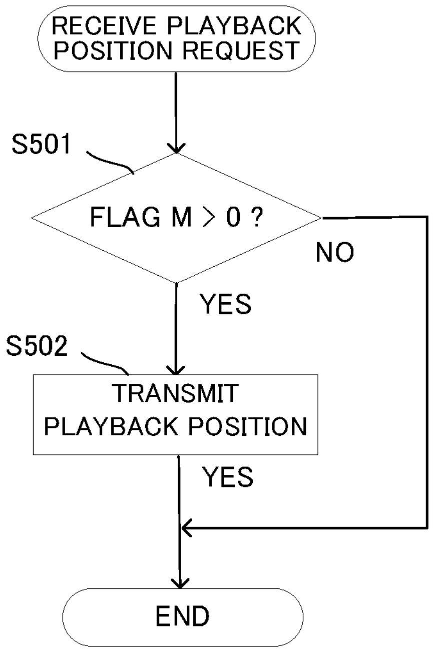
FIG. 11 is a flow chart for showing the process performed when a mobile terminal booth receives a playback position request signal broadcasted from another mobile terminal booth when synchronizing music among a plurality of mobile terminal booths in accordance with the another example of the present invention.

FIG. 11 is a flow chart for showing the process performed when a mobile terminal booth receives a playback position request signal broadcasted from another mobile terminal booth. Receiving the playback position request signal, the mobile terminal booth determines whether or not this mobile terminal booth is the master booth. Namely, in step 501, it is determined whether or not the flag M is greater than "0".

If the flag M is not greater than "0" (No in step 501), i.e., if the mobile terminal booth is not the master booth, the process is simply terminated. If the flag M is greater than "0" (Yes in step 501), i.e., if the mobile terminal booth is the master booth, the mobile terminal booth transmits the current playback position and the process is terminated (step 502).

Figure 12:
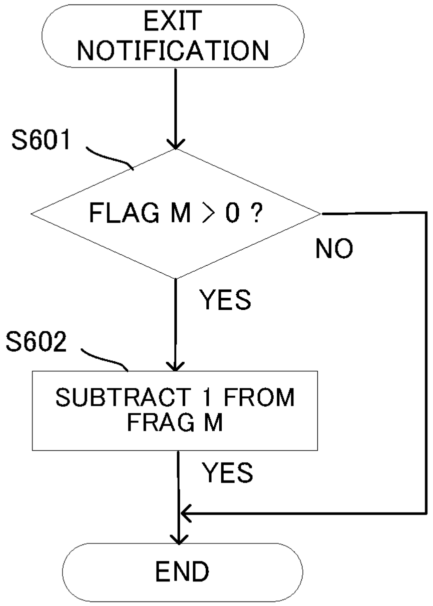
FIG. 12 is a flow chart for showing the process performed when a mobile terminal booth receives an exit notification broadcasted from another mobile terminal booth when synchronizing music among a plurality of mobile terminal booths in accordance with the another example of the present invention.

FIG. 12 is a flow chart for showing the process performed when a mobile terminal booth receives an exit notification broadcasted from another mobile terminal booth. Receiving the exit notification, it is determined whether or not the mobile terminal booth is the master booth. Namely, in step 601, it is determined whether or not the flag M is greater than "0".

If the flag M is not greater than "0" (No in step 601), i.e., if the mobile terminal booth is not the master booth, the process is simply terminated. If the flag M is greater than "0" (Yes in step 601), i.e., if the mobile terminal booth is the master booth, the mobile terminal booth decrements the flag M by one and the process is terminated (step 602).

As has been discussed above, by performing the processes shown in FIG. 11 and FIG. 12 together with the process shown in FIG. 10, some mobile terminal booth always becomes a master booth so that the playback position is notified to a mobile terminal booth which is to start the playback and it is possible to establish synchronism of the playback timings among the mobile terminal booths. Accordingly, even when a plurality of mobile terminal booths play back music, the sounds from the mobile terminal booths do not interfere with each other and function as one masking sound to which the surrounding person pays attention but not to the conversation in the mobile terminal booths.

Meanwhile, also in this embodiment, a masking sound consisting mainly of noise is used together to enhance the masking effect. Persons outside the mobile terminal booth pay attention to music as a masking sound having a particular meaning but not to the conversation which is made in the mobile terminal booth and made less audible due to the masking sound mainly consisting of noise having no meaning.

In the case of the aforementioned embodiment, playback of music is halted when the user exits. However, since the masking sound having a particular meaning such as music does not deteriorate the surrounding sound environment, the playback of music can be continued as it is even after the user exits. Contrary to this, since the noise having no meaning is harsh-sounding, the reproduction of the noise is stopped after the user exits.

When the mobile terminal booth starts playback of music, a playback position request signal is broadcasted. If there is another mobile terminal booth in which music is played back, a playback position is returned in response to this playback position request signal. The mobile terminal booth which has broadcasted the playback position request signal receives the playback position and plays back music from this playback position.

The reproduction of the masking sound consisting mainly of noise having no meaning is started with the timing when a detection signal is output from the detection circuit 224, i.e., when the user having entered the mobile terminal booth starts conversation, and stopped when the human detection sensor 230 detects exit of the user. Needless to say, synchronization is unnecessary for the noise having no meaning.

Incidentally, in the case of the above embodiments, the body of the music file may be stored in the storage device of only one of a plurality of mobile terminal booths. When music is played back from another mobile terminal booth, this another mobile terminal booth receives streaming distribution performed by the one mobile terminal booth.

As has been discussed above, the masking sound generation unit in accordance with the above embodiment comprises: a sound absorbing panel which partitions a space as viewed from the above to provide an inside place where a mobile terminal can be used; a speaker provided to emit sounds to an outside of the mobile terminal booth; and a masking sound generation unit provided to emit a masking sound through the speaker, wherein it is possible to enhance the masking effect from both psychological and auditory aspects by making use of a masking sound having a clear temporal context and having a particular meaning such as music or recitation and furthermore superimposing meaningless wideband noise on this masking sound.

Figure 13:
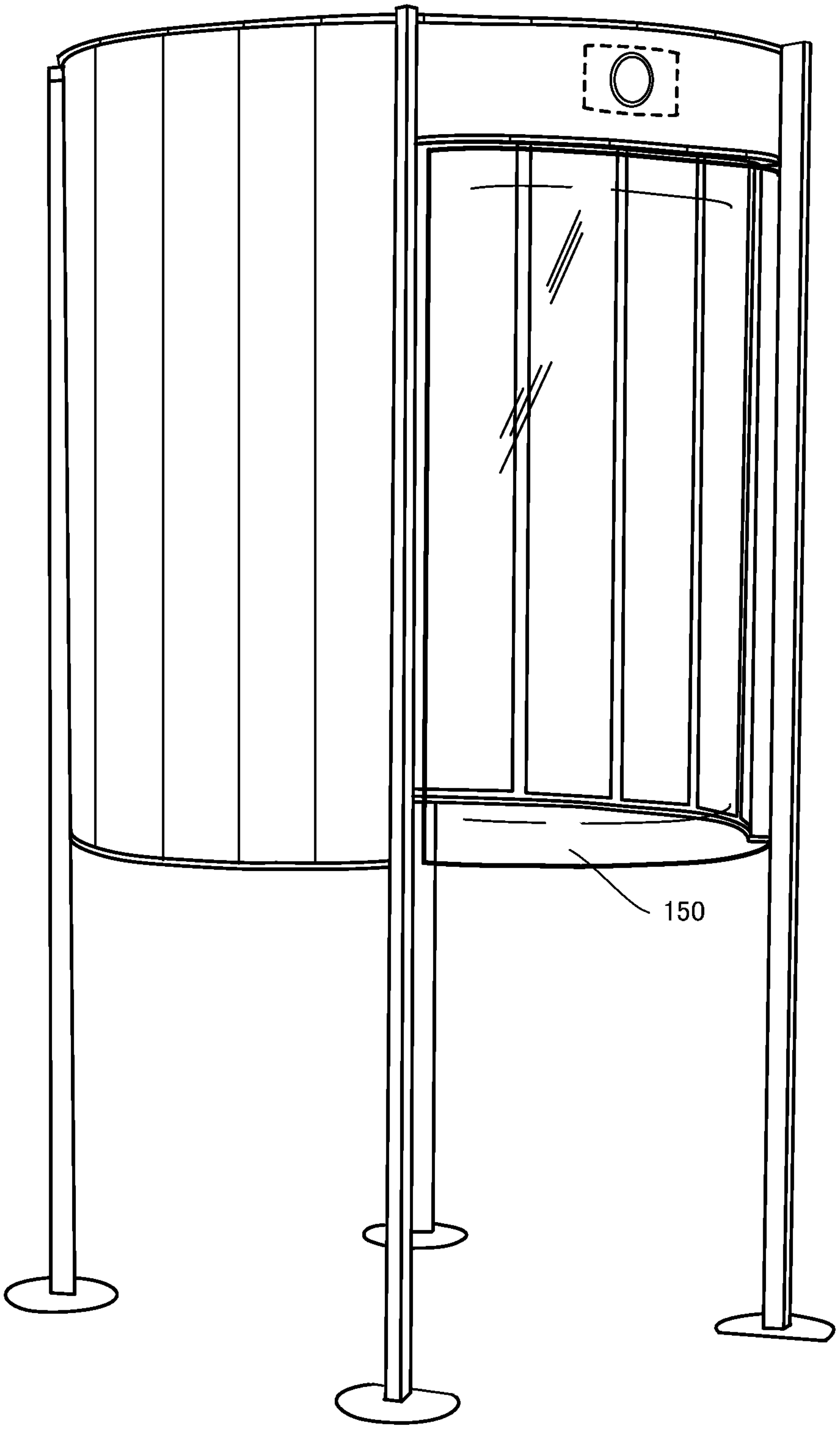
FIG. 13 is a perspective view for showing a mobile terminal booth in accordance with an embodiment of the present invention which is provided with a transparent acrylic door.

The mobile terminal booth of the aforementioned example is designed in the form of a cylinder having an opening in the front side. however, as illustrated in FIG. 13, a transparent acrylic door 150 can be provided to close this opening. This acrylic door 150 slides in the circumferential direction of the mobile terminal booth along a rail structure provided on the inside of the mobile terminal booth to open or close the opening.

In this case, while the acrylic door 150 occludes the inside of the mobile terminal booth, the transparecy of the door 150 lessens the blocking feeling. The door 150 reduces the volume of voices leaking to the outside. Particularly, the high frequency components of voices leaking to the outside are substantially attenuated. Accordingly, the high frequency components of the masking sound can be more attenuated by the high frequency attenuation.

Figure 14:
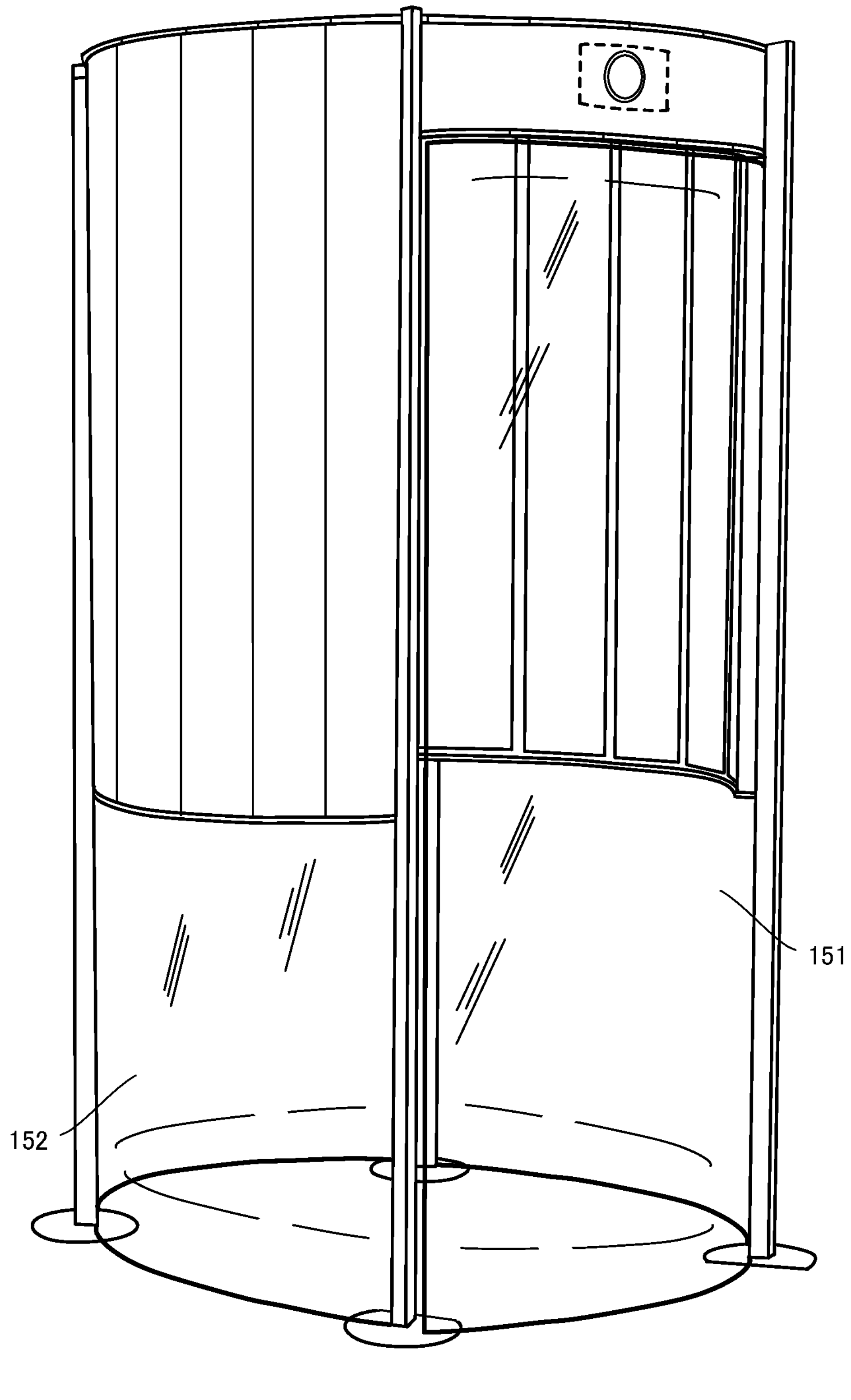
FIG. 14 is a perspective view for showing a mobile terminal booth in accordance with an embodiment of the present invention which is provided with another type of a transparent acrylic door.

The acrylic door 150 as shown in FIG. 13 is supported with its lower edge which are positioned 90 cm above from the floor in the same manner as the plate-like sound absorbing panel 111. Accordingly, the section of a user above the waist is surrounded by the plate-like sound absorbing panel 111 and the acrylic door 150. On the other hand, the lower part of the mobile terminal booth below the waist, i.e., the space from the floor to 90 cm height is opened. However, the lower part of the mobile terminal booth can be closed to enhance the sealability of the inside space. Namely, the acrylic door 150 shown in FIG. 13 is extended downward to the floor to completely cover the front side as an acrylic door 151 illustrated in FIG. 14. In addition to this, a transparent acrylic panel 152 is installed to cover the lower part of the mobile terminal booth from the lower edge of the plate-like sound absorbing panel 111 to the floor. By this configuration, the internal space of the mobile terminal booth is completely sealed so that voices leaking outside becomes more small to further attenuate the high frequency components of the voices leaking outside. Accordingly, the high frequency components of the masking sound can be more attenuated by the high frequency attenuation.

Figure 15:
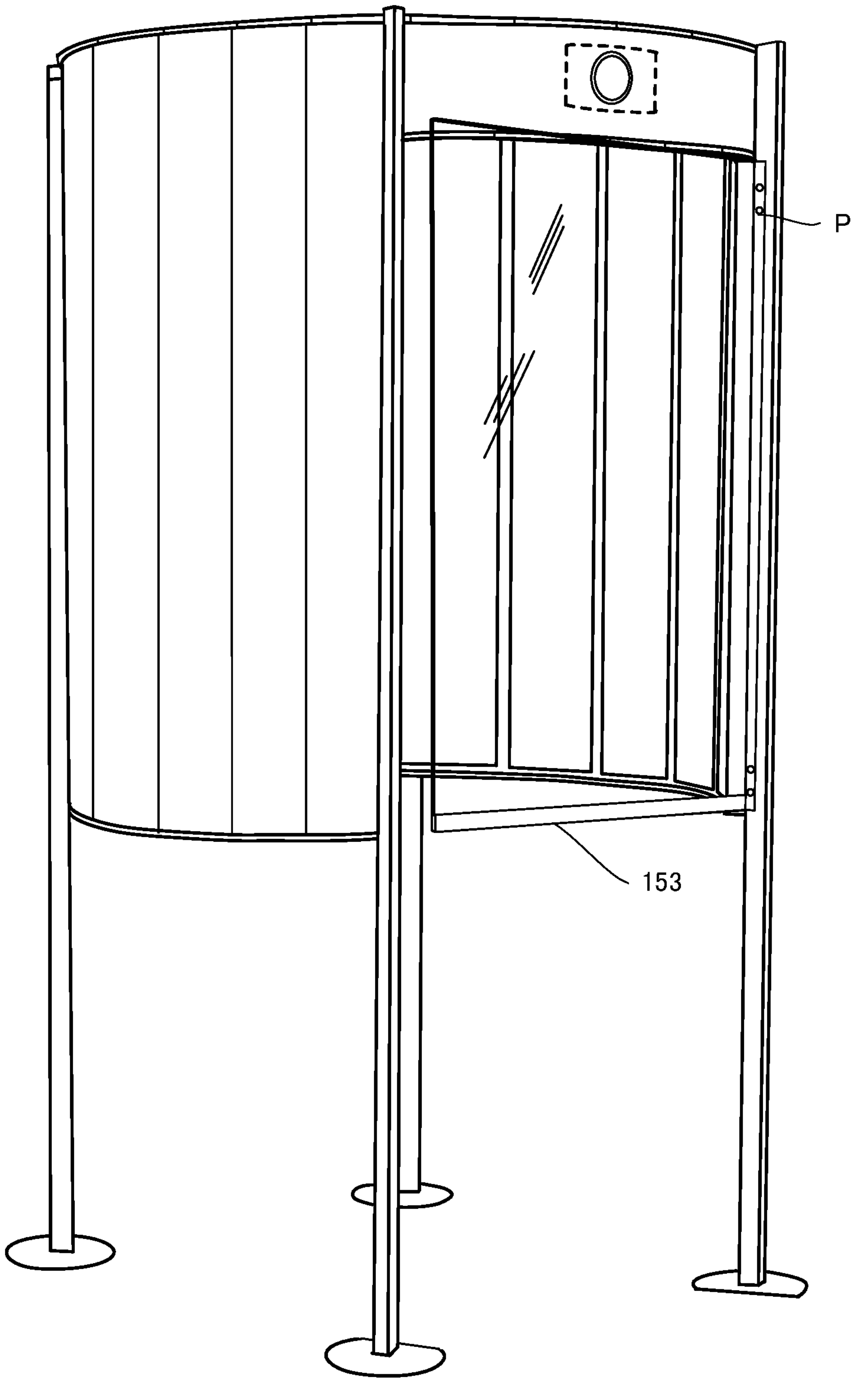
FIG. 15 is a perspective view for showing a mobile terminal booth in accordance with an embodiment of the present invention which is provided with a further type of a transparent acrylic door.

Meanwhile, the acrylic door 150 slides in the circumferential direction of the mobile terminal booth along a rail structure provided on the inside of the mobile terminal booth to open or close the opening. This structure prevents the transparent acrylic door 150 from getting in the way to realize barrier-free. However, a usual hinged door can be used in place of the slide door such as a transparent acrylic door 153 which pivots around a hinge P as illustrated in FIG. 15.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

With the masking system in accordance with the present invention, the harsh-sounding high frequency components of the masking sound as used are attenuated so that the masking sound gives less uncomfortable feeling to persons surrounding the mobile terminal booth. Furthermore, also for the user making conversation, the masking sound is relatively not so harsh-sounding.

Furthermore, the mobile terminal booth according to the present invention is provided with the masking sound generation unit so that, when telephone conversation is made in the mobile terminal booth, the content of conversation is inaudible for persons outside the mobile terminal booth. Accordingly, it is possible to protect speech privacy. Also, since the masking sound generation unit emits a masking sound whose harsh-sounding high frequency components are attenuated, the masking sound gives less uncomfortable feeling to persons surrounding the mobile terminal booth. Furthermore, also for the user having telephone conversation in the mobile terminal booth, the masking sound is relatively not so harsh-sounding. As a result, it is possible to promote the use of the mobile terminal booth.

Also, in accordance with a preferred embodiment, a sound material having a particular meaning is used as the masking sound such as music, a person's voice, the tweet of a bird, sound of restless waves, or the like, so that it is possible to lessen the deterioration of the sound environment due to the masking sound. Furthermore, when a plurality of mobile terminal booths are installed adjacent to each other, the masking sounds output from these mobile terminal booths shall not interfere with each other and confuse the listeners. As a result, it is possible to promote the use of the mobile terminal booth.

EXPLANATION OF SYMBOLS

100 mobile terminal booth
101 plate-like sound absorbing panel
110 sound absorbing unit
111 plate-like sound absorbing panel
113 aluminum panel
115 sound absorbing member
115*c* soft polyvinyl chloride plate
115*a* sound absorbing sheet
115*b* vinyl film
115*d* cloth
115*h* circular opening
120 support frame
121 pipe
123 adjuster foot
123*c* cut-off part
140 fascia
141 panel cap
150 door

200 masking sound generation unit
200*s* speaker
202 amplifier
210 storage device
220 microphone
221 amplifier
222 high path filter
223 detection circuit
224 detection circuit
230 human detection sensor
231 amplifier
233 detection circuit
240 data process control circuit
250 communication interface

The invention claimed is:

1. A mobile terminal booth with a sound masking function comprising:

a sound absorbing panel which partitions a space as viewed from above to provide an inside place where a mobile terminal can be used;

a speaker provided to emit sounds to an outside of the mobile terminal booth; and a masking sound generator configured to emit a masking sound through the speaker, wherein a high frequency component of the masking sound is attenuated, the masking sound is generated by attenuating a high frequency component of a raw sound material including a natural sound, and, when the human detection sensor detects a user entering the mobile terminal booth, background music is emitted first from the speaker, and then the masking sound is emitted from the speaker to overlap the background music.

2. A method for generating masking sounds from a plurality of mobile terminal booths installed adjacent to each other, comprising:

detecting entrance of a user by detecting infrared rays with a human detection sensor;

generating masking sounds that include a sound having a clear temporal context and having a particular meaning, and synchronizing the masking sounds from the plurality of mobile terminal booths with each other, wherein, while the masking sound is generated from a first mobile terminal booth of the plurality of mobile terminal booths, when generation of the masking sound is to start anew in a second mobile terminal booth, the second mobile terminal booth acquires a current playback position of the masking sound from the first mobile terminal booth generating the masking and starts generation of the masking sound from the playback position as acquired.

3. A method for generating masking sounds from a plurality of mobile terminal booths installed adjacent to each other, comprising:

generating masking sounds that include a sound having a clear temporal context and having a particular meaning, and synchronizing the masking sounds from the plurality of mobile terminal booths with each other, wherein, while the masking sound is generated from a first mobile terminal booth of the plurality of mobile terminal booths, when generation of the masking sound is to start anew in a second mobile terminal booth, the second mobile terminal booth acquires a current playback position of the masking sound from the first mobile terminal booth generating the masking, and starts generation of the masking sound from the playback position as acquired.

* * * * *